T. L. STURTEVANT.
VALVE MECHANISM FOR INTERNAL COMBUSTION ENGINES.
APPLICATION FILED SEPT. 12, 1917.
1,281,246.
Patented Oct. 8, 1918.
2 SHEETS—SHEET 1.
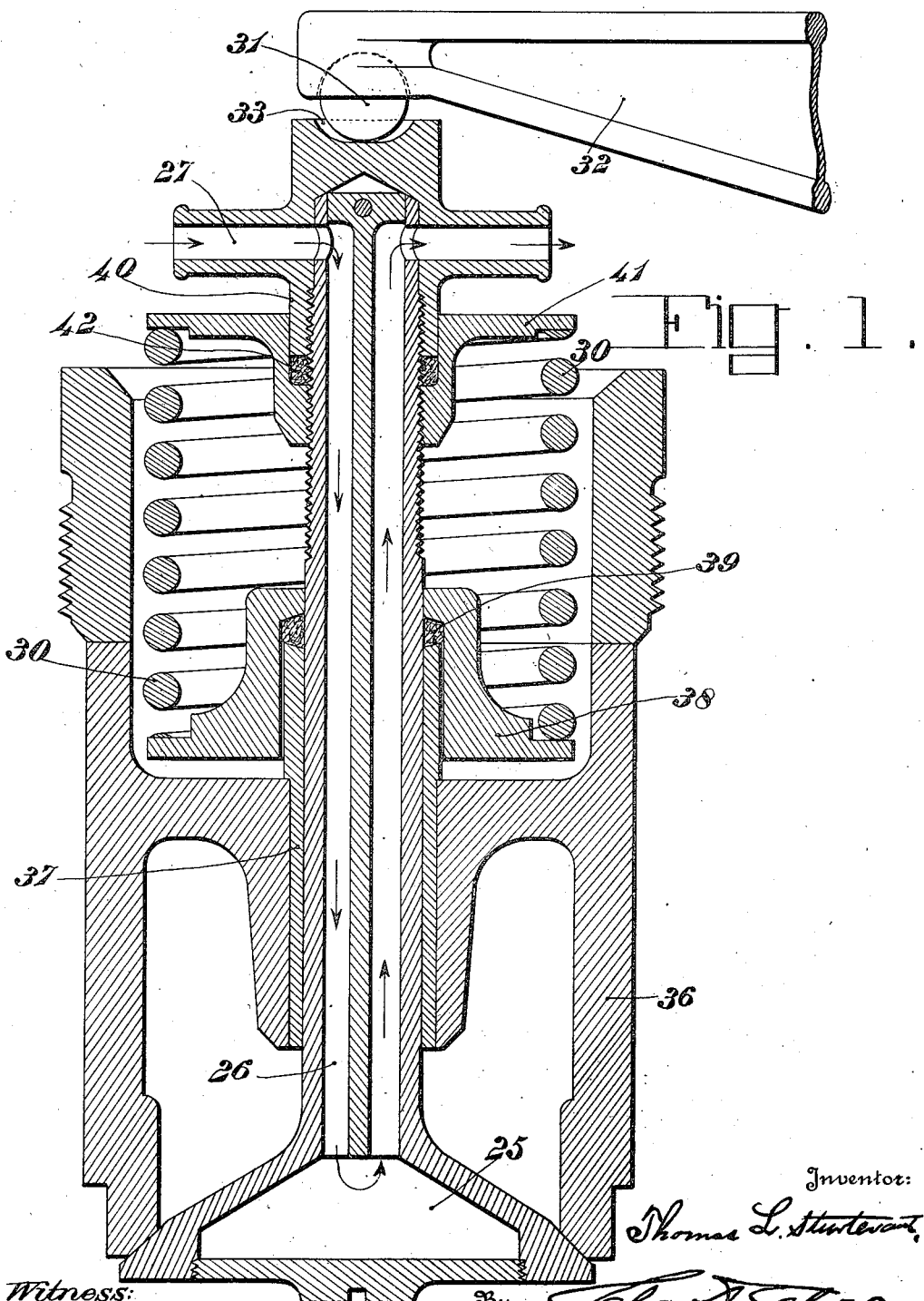

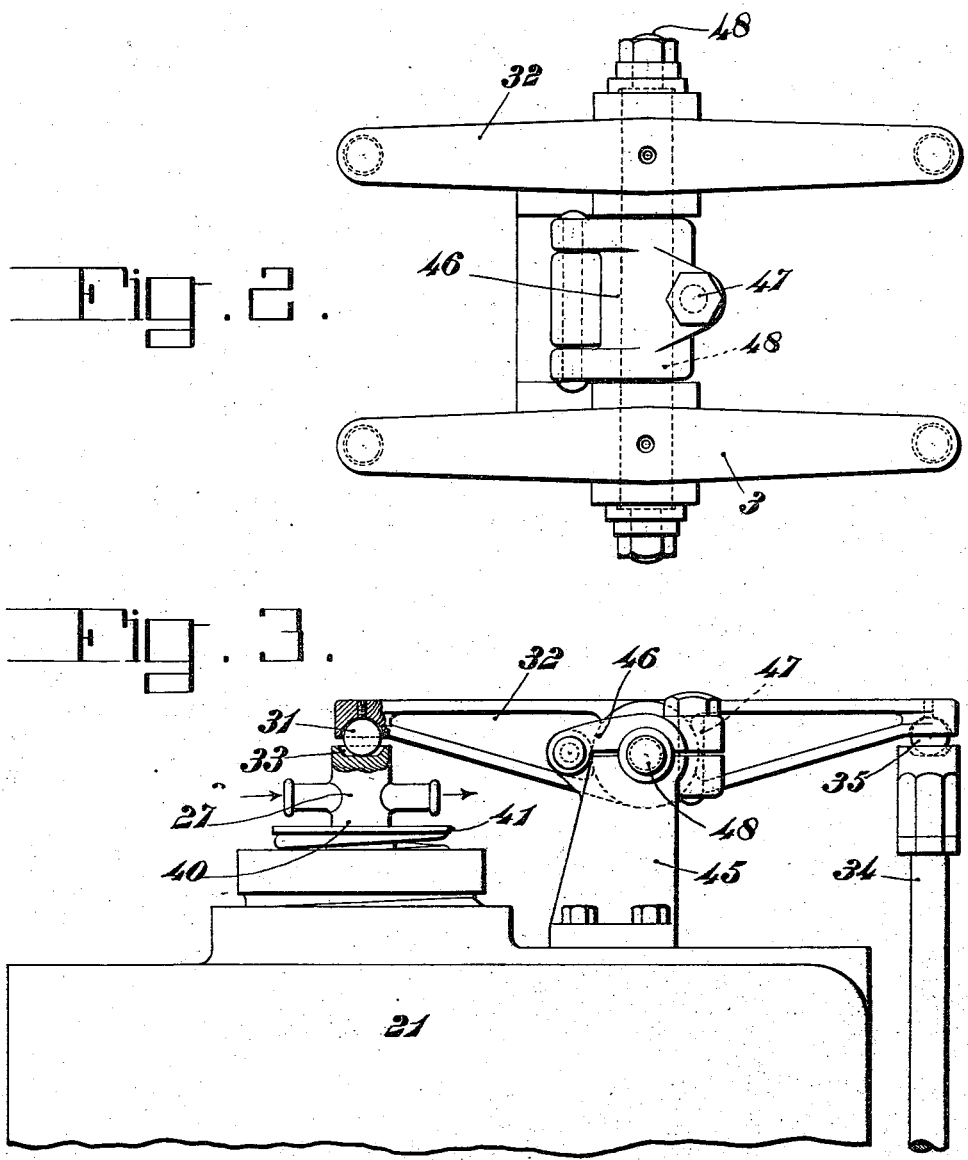

UNITED STATES PATENT OFFICE.

THOMAS LEGGETT STURTEVANT, OF WELLESLEY, MASSACHUSETTS, ASSIGNOR TO STURTEVANT MILL COMPANY, A CORPORATION OF MAINE.

VALVE MECHANISM FOR INTERNAL-COMBUSTION ENGINES.

1,281,246.  Specification of Letters Patent.  Patented Oct. 8, 1918.

Original application filed June 16, 1917, Serial No. 175,198. Divided and this application filed September 12, 1917. Serial No. 191,094.

*To all whom it may concern:*

Be it known that I, THOMAS L. STURTEVANT, a citizen of the United States, residing at Wellesley, in the county of Norfolk and State of Massachusetts, have invented or discovered certain new and useful Improvements in Valve Mechanisms for Internal-Combustion Engines, of which the following is a specification, reference being had thereto in the accompanying drawings.

This invention relates to that class of internal combustion engines more especially adapted for use as marine engines, and consists of certain improvements in the inventions covered by the Sturtevant U. S. Patents Nos. 1,164,675 and 1,185,951, the present improvements relating more especially to the valve mechanism of the engine shown in my application Serial No. 175,198, filed June 16, 1917, and of which application the present case is a division.

In the accompanying drawings Figure 1 is a vertical section of a valve cage, valve parts and valve-operating means, and Figs. 2 and 3 are detail views of the valve-operating mechanism.

Referring to the drawings, the valves 25 and the valve rods or stems 26 are preferably formed hollow, as in the constructions shown in U. S. Patent No. 1,186,860, so that the cooling water will be circulated through the same, said valve rods being provided at their tops with hollow heads 27 communicating by means of flexible pipes with the chambers of the water-jacketed cylinder heads 21.

To avoid side strain on the hollow valve rods or valve stems 26, and thereby lessen cramping and friction on said valve rods or stems as the valves are forced downward against the stress of their closing springs 30 to open the valves, balls 31, loosely resting and slightly rolling in flat-bottomed cupped seats 33 formed in the tops of the valve rods, are interposed between the rockers 32 and said valve rods or stems. The rockers 32 are preferably operated from lifting rods 34 through the medium of balls 35 interposed between the upper ends of the said lifting rods 34 and the outer ends of the rockers 32, said balls 35 also preferably resting loosely in flat-bottomed cupped seats 33 in the upper ends of said lifting rods 34. The cupped upper ends of the upright valve stems and valve-operating rods are adapted to receive and hold a lubricant to lessen the friction of the contiguous parts, as will be obvious. The rockers 32 are mounted on standards or brackets 45 on the cylinder heads 21 and their attached pivot-pins 48, carrying two sets of arms, are preferably removably held in their seats by hinged caps 46 and clamping screw bolts 47.

In view of the fact that the valve rods or valve stems are operated with little friction and are kept properly cooled, as hereinbefore indicated, it is practicable to pack them tight, both against leakage of gas from the chambers of the valve cages 36 and also against leakage of water from the hollow water-carrying heads 27, at the upper ends of the valve rods. To this end the cages 36 are preferably provided with fixed sleeves 37 between the tops of which and flanged collars 38, on which the valve closing springs 30 rest, are interposed packings 39, these packings being at all times automatically compressed by the stress of the springs 30 on the flanges of the collars 38. Also interposed between the bottoms of sleeves 40, depending from the hollow heads 27, and the sleeves of the flanged collars 41 on the valve stems and against the flanges of which collars the valve-closing springs 30 bear, are interposed packings 42 which can be properly compressed by screwing up said flanged collars 41 on the threaded portions of the valve rods 26. Thus the flanged collars 38 and 41 serve as glands for the packings 39 and 42, respectively, the packings 39 being automatically compressed by the stress of the springs 30, and the packings 41 being compressed by properly screwing up the flanged collars 41 on the threaded portions of the valve rods 26. If it were not for the fact that the valve stems 26 were water-cooled the packings 39 and 42 could not be properly lubricated and used, but would be ruined by heat. I refer to these valves and valve parts in the plural for the reason that the engine is provided with a plurality of valves, as usual.

The flanged collars or glands 38 are supported above the bottoms of the spring-inclosing chambers in the valve cages 36, and clearance spaces are provided between the flanges of said collars or glands and the inner walls of the cages, so as to afford more or less air circulation and also so as to prevent the said collars or glands from becoming heated by conduction from the cages, and thus injury to the packings 39 by heat is avoided so far as possible.

The invention is not to be understood as being limited to all of the details herein shown, as such details may be varied widely, within the province of mechanical skill, without departing from the scope thereof. It will be understood that the anti-friction balls interposed between the valve-actuating rockers 32 and the valve rods or stems 26, and by which side-thrust on the said valve rods or stems and resulting cramping are largely avoided, might be employed in engines in which the valve stems or rods reciprocate horizontally.

While it is preferred to form the loose seats for the balls which are interposed between the valve stems and the valve operating rods, either on said stems or rods, it will be understood that these loose seats might be formed partly on the operating arms and partly on the valve stems and valve operating arms, it being essential only that the balls should be loosely interposed between the parts referred to so that they may have slightly rolling movements in operation, and that means should be provided for holding the said balls in place. While the cupped seats on the valve stems and valve operating rods are preferably formed with slightly flattened bottoms as shown, it will be understood that this is not essential so long as slightly rolling movements of the balls is permissible to prevent lateral pressure on the parts, particularly the valve stems.

Having thus described my invention I claim and desire to secure by Letters Patent:

1. In an internal combustion engine, the combination with a water cooled valve having a hollow stem, of a spring for closing said valve, upper and lower packings surrounding said valve stem and affording water tight and gas tight joints, and flanged collars between which said spring is interposed and which serve as glands for said packings.

2. In an internal combustion engine, the combination with a water cooled valve having a hollow stem, of a spring for closing said valve, upper and lower packings surrounding said valve stem and affording water tight and gas tight joints, and flanged collars between which said spring is interposed and which serve as glands for said packings, said valve stem being provided near its end with hollow water inlet and outlet parts communicating with said hollow stem.

3. In an internal combustion engine, the combination with a valve having a stem, of a spring for closing said valve, upper and lower packings surrounding said valve stem and affording water-tight and gas-tight joints, and flanged collars between which said spring is interposed and which serve as glands for said packings.

4. In an internal combustion engine, the combination with a valve having a stem provided with a cupped upper end adapted to receive and hold a lubricant, of a spring for closing said valve, a rocker for opening said valve against the stress of said spring, and an anti-friction ball interposed between said rocker and valve stem and resting loosely in the said cupped end of said valve stem so that it may roll in its cup when said rocker is in operation.

5. In an internal combustion engine, the combination with a valve having a stem provided with a cupped upper end adapted to receive and hold a lubricant and having a flat-bottomed seat, of a spring for closing said valve, a rocker for opening said valve against the stress of said spring, and an anti-friction ball interposed between said rocker and valve-stem and resting loosely on said flat-bottomed seat so that it may roll on its seat when said rocker is in operation.

6. In an internal combustion engine, the combination with a valve having a stem provided with a cupped upper end adapted to receive and hold a lubricant, of a spring for closing said valve, a rocker for opening said valve against the stress of said spring, an anti-friction ball interposed between said rocker and said valve stem and resting loosely in said cupped end of said valve stem so that it may roll in its cup when said rocker is in operation, an operating member for said rocker, said operating member also having a cupped upper end, and an anti-friction ball loosely interposed between said operating member and said rocker, said last-named ball being also adapted to roll on its seat when said rocker is in operation.

7. In an internal combustion engine, the combination with a valve having a stem provided with a cupped upper end having a flat-bottomed seat, of a spring for closing said valve, a rocker for opening said valve against the stress of said spring, an anti-friction ball interposed between said rocker and valve stem and resting loosely and adapted to roll on said flat-bottomed seat, an operating member for said rocker, said operating member also having a cupped upper end, and an anti-friction ball loosely interposed between said operating member and said rocker and also adapted to roll in its seat when said rocker is in operation.

8. In an internal combustion engine, the combination with spring-closed valves, of a valve-opening rocker having an attached pivot pin, a bearing or bearings for said pivot pin, and a hinged cap and clamping bolt by which said pin is removably mounted in its bearing or bearings.

9. In an internal combustion engine, the combination with spring-closed valves, of a valve-opening rocker consisting of two sets of rocker arms and an attached pivot pin, a bearing or bearings for said pivot pin, and a hinged cap and clamping bolt by which said pin is removably mounted in its bearing or bearings.

10. In an internal combustion engine, the combination with a valve having a stem, of a spring for closing said valve, an operating device for opening said valve against the stress of said spring, an anti-friction ball loosely interposed, so that it may roll on its seat, between said operating device and said valve stem, and means for holding said ball in place while permitting slightly rolling movements thereof.

In testimony whereof I affix my signature.

THOMAS LEGGETT STURTEVANT.

Witnesses:
WILLIAM T. DOYLE,
EVA W. WHITE.